United States Patent [19]

Yamamoto et al.

[11] Patent Number: 5,222,198

[45] Date of Patent: Jun. 22, 1993

[54] CONTROL METHOD AND APPARATUS FOR A ROBOT HAVING MULTI-ROTATING AXES

[75] Inventors: Minoru Yamamoto; Satoshi Gosho, both of Kitakyushu, Japan

[73] Assignee: Kabushiki Kaisha Yaskawa Denki Seisakusho, Fukuoka, Japan

[21] Appl. No.: 871,609

[22] PCT Filed: May 1, 1989

[86] PCT No.: PCT/JP89/00457

§ 371 Date: Jan. 2, 1990

§ 102(e) Date: Jan. 2, 1990

[87] PCT Pub. No.: WO89/10822

PCT Pub. Date: Nov. 16, 1989

Related U.S. Application Data

[63] Continuation of Ser. No. 457,799, Jan. 2, 1990, abandoned.

[30] Foreign Application Priority Data

May 6, 1988 [JP] Japan .................. 63-110797

[51] Int. Cl.[5] .................. G05B 19/42; G06F 15/46
[52] U.S. Cl. .................. 395/80; 395/87; 318/568.15
[58] Field of Search .................. 395/80, 87; 318/568.15

[56] References Cited

U.S. PATENT DOCUMENTS

| | | | |
|---|---|---|---|
| 4,409,650 | 10/1983 | Noguchi | 364/177 |
| 4,445,184 | 4/1984 | Noguchi | 318/568.15 |
| 4,517,653 | 5/1985 | Tsuchihashi et al. | 364/513 |
| 4,523,287 | 6/1985 | Kogawa | 364/474.35 |
| 4,578,749 | 3/1986 | Kuno et al. | 364/474.12 |
| 4,600,869 | 7/1986 | Sekine et al. | 364/513 |
| 4,608,651 | 8/1986 | Murakami et al. | 364/513 |
| 4,672,279 | 6/1987 | Hosokawa et al. | 307/67 |
| 4,743,819 | 5/1988 | Hashizume | 364/513 |
| 4,831,547 | 5/1989 | Ishiguro et al. | 318/568.19 |
| 4,833,624 | 5/1989 | Kuwahara et al. | 364/513 |
| 4,843,292 | 6/1989 | Ono et al. | 318/640 |
| 4,915,040 | 4/1990 | Sakuma et al. | 112/121.26 |

Primary Examiner—Allen R. MacDonald
Assistant Examiner—George Davis
Attorney, Agent, or Firm—Jordan and Hamburg

[57] ABSTRACT

The operating range of the conventional multi-axis joint type robot has been restricted, from its structural reason, with ±180° for all axes provided. However, recently, expansion of the operating range of robots has been required and improvement in structure and control method of robots has realized expansion of the operating range to under ±360°. But, in the case of the robot providing the axis rotating ±360° or more, it is sometimes difficult to apply such control methods, resulting in disabling operations. In the present invention, therefore, the signal obtained by adding or subtracting the signal corresponding to the integer number of rotations of the axis to or from the rotating position signal after rotation of the axis depending on the positive or negative sign of the rotating position signal is applied as the rotating position at the time of starting the posture control operation. Since the corrected link angle has a value under ±360°, the smooth interpolating operation can be realized by applying the control method described above. Accordingly, the operating range of multiple axes joint type robot can be expanded.

2 Claims, 4 Drawing Sheets

FIG. 4
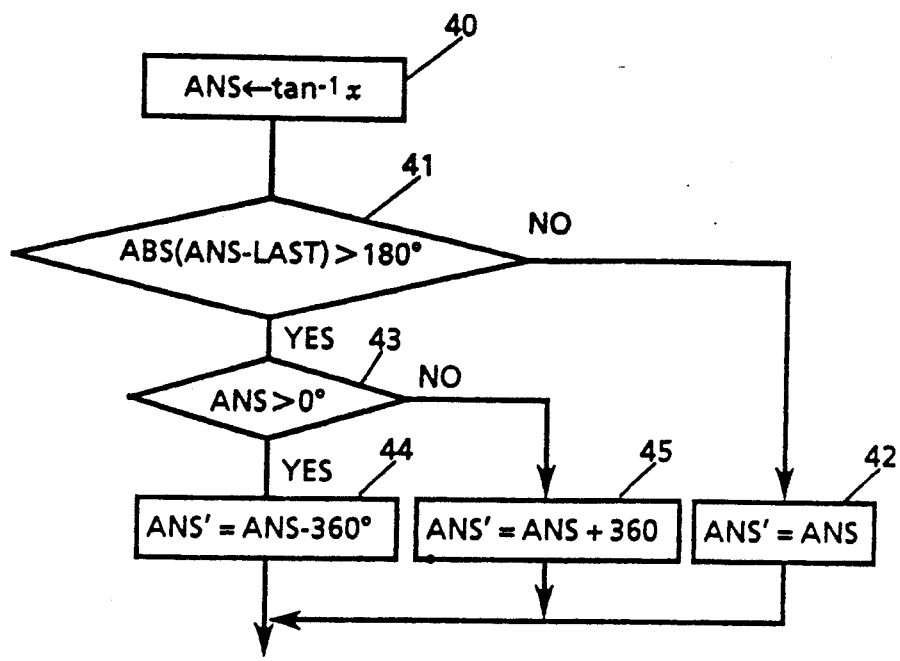
FIG. 5A
FIG. 6A
FIG. 5B
FIG. 6B
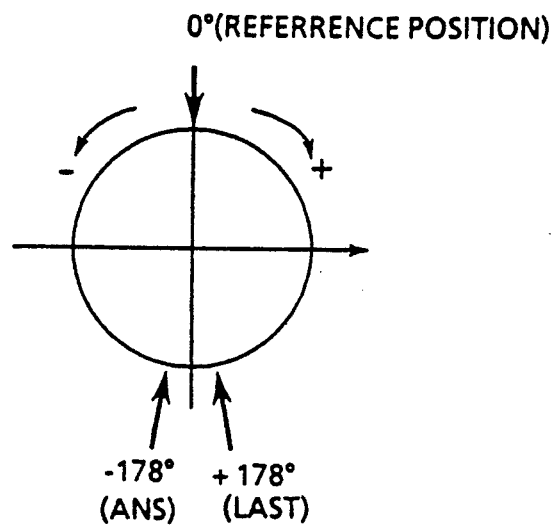
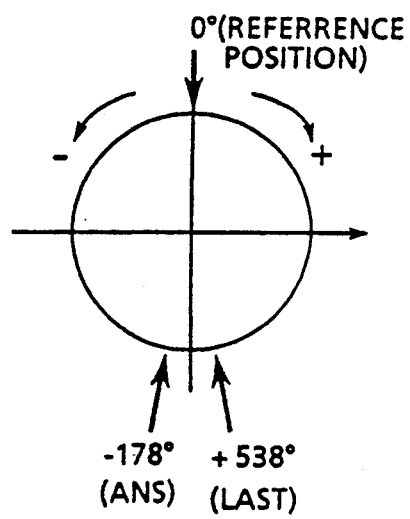

CONTROL METHOD AND APPARATUS FOR A ROBOT HAVING MULTI-ROTATING AXES

This application is a continuation of application Ser. No. 07/457,799 which was filed on Jan. 2, 1990 and now abandoned.

FIELD OF ART

The present invention relates to a control method and apparatus including multiple rotating operations of at least one axis of a multiple axes (e.g. six axes) joint type robot.

BACKGROUND OF THE INVENTION

A six axes joint type robot including three basic axes and three wrist axes is structured by the following six axes as shown in FIG. 6:

(1) A 1st axis 2 provided at the upper part of a base 1 fixed on the ground to have the degree of freedom around the perpendicular ($Z_0$ axis)
(2) A 2nd axis 3 provided at the end part of the 1st axis 2 to have the degree of freedom around the $Z_1$ axis perpendicular to the $Z_0$ axis
(3) A 3rd axis 4 provided at the end part of the 2nd axis 3 to have the degree of freedom around the $Z_2$ axis parallel to the $Z_1$ axis
(4) A 4th axis 5 provided at the end part of the 3rd axis 4 to have the degree of freedom around the $Z_3$ axis perpendicular to the $Z_2$ axis
(5) A 5th axis 6 provided at the end part of the 4th axis 5 to have the degree of freedom around the $Z_4$ axis perpendicular to the $Z_3$ axis
(6) A 6th axis 7 provided at the end part of the 5th axis 6 to have the degree of freedom around the $Z_5$ axis perpendicular to the $Z_4$ axis The 1st axis 2 to 3rd axis 4 are called the three basic axes, while the 4th axis 5 to 6th axis 7 are called the three wrist axes.

As described above, each joint has one degree of freedom and the robot as a whole has six degrees of freedom.

In such a six joint type robot, each axis has a restricted operating range within ±180 degrees from the structural reason thereof.

Recently, there has been a demand for the expansion of the operating range of robots. For this purpose, the structure of robots has been modified to provide the axes for realizing rotation of ±180 degrees or more. Thereby, the operating range can be expanded up to the range under ±360 degrees with improvement of the control method.

Such improved control method will be explained in the sequence of the flowchart shown in FIG. 4 with a calculation example of link angle (angle of each axis in the joint coordinates system) of the wrist joint (the 6th axis 7 in FIG. 3).

In the case of realizing linear interpolating operation by the 6 axes joint type robot shown in FIG. 3, the robot is operated by converting the rectangular coordinate data (position data and posture data) into each joint coordinate data (reverse conversion) in every one unit clock (one sampling period) to obtain a command value of each axis in the joint coordinate system and by giving such command values to each drive axis.

An example of such reverse conversion is described in the Japanese Laid-open Patent No. 62-193786. Namely in the reverse conversion, the command values of link angles $\theta_1$–$\theta_6$ are obtained by the first step for calculating the link angles $\theta_1$, $\theta_2$, $\theta_3$ of three basic axes from the position data $P_x$, $P_y$, $P_z$, the second step for calculating the link angles $\theta_4$, $\theta_5$, $\theta_6$ of the wrist joints from the posture data $A_x$, $A_y$, $A_z$ (vectors of direction in which the robot hand comes near to an object), $O_x$, $O_y$, $O_z$ (vectors for designating the direction of robot hand) and $N_x$, $N_y$, $N_z$ (vectors of tangent direction for designating three vectors to retake the right hand system) and the link angles $\theta_1$, $\theta_2$, $\theta_3$ of three basic axes obtained in the first step, and the third step for calculating again the link angles of three basic axes from the above position data and the link angles obtained in the second step.

Step 40 in FIG. 4 indicates a step for obtaining the link angle of the 6th axis (link angle at the next position where the control point of the robot is to be moved to as a target) through the reverse conversion by the procedures explained above. In this case, the link angle of the obtained target value is defined as ANS. In step 40 of FIG. 4, x can be calculated from the formula $$x = \sin\theta_6 / \cos\theta_6$$

which is prepared for obtaining ANS by the reverse conversion.

Here, the link angle of the target value ANS can be obtained from the position data and posture data, according to the reverse conversion method described above. This link angle is defined as a value uniquely within the range of $-180°$–$+180°$ by obtaining a value of $\tan^{-1}x$ considering the signs of $\sin\theta_6$ and $\cos\theta_6$. However, the sign of angle which indicates the position is defined as $+$ for clockwise from the reference position (0°) and $-$ for counterclockwise.

After obtaining the link angle of target value ANS, a difference between ANS and the link angle of current value LAST is obtained in step 41 and checked to determine whether the absolute value thereof ABS. (ANS−LAST) exceeds 180° or not. This check is carried out to determine the moving direction so that the movement (rotating angle) is minimized.

Here, in case ABS (ANS−LAST)≦180°, correction of link angle of the target value is unnecessary. Therefore, the link angle of final target value ANS′ is set equal to ANS (ANS′=ANS) in step 42.

In case ABS (ANS−LAST)>180°, check for the link angle of target value ANS (ANS>0°) is carried out in step 43.

Upon reception of this result, correction of the link angle of target value ANS is carried out in steps 44 and 45. In this case, the link angle of target value ANS is corrected to ANS′=ANS−360° in step 44 or to ANS′=ANS+360° in step 45.

In this method, there are teaching points (S, E) as shown in FIG. 5A and it is here supposed to conduct the linear interpolating operation between two points. When the target point after the one unit clock from the point (P) in the interpolating operation is defined as P′, position and posture data are expressed respectively as follows.

$$P = \begin{bmatrix} X \\ Y \\ Z \\ \vec{N} \\ \vec{O} \\ \vec{A} \end{bmatrix}, P' = \begin{bmatrix} X \\ Y \\ Z \\ \vec{N} \\ \vec{O} \\ \vec{A} \end{bmatrix} + \begin{bmatrix} \Delta X \\ \Delta Y \\ \Delta Z \\ \vec{\Delta N} \\ \vec{\Delta O} \\ \vec{\Delta A} \end{bmatrix}$$

Where $$\vec{N} = \begin{bmatrix} N_x \\ N_y \\ N_z \end{bmatrix}, \vec{O} = \begin{bmatrix} O_x \\ O_y \\ O_z \end{bmatrix}, \vec{A} = \begin{bmatrix} A_x \\ A_y \\ A_z \end{bmatrix}$$

The link angle of the 6th axis at the point P' can be calculated by the reverse conversion from the position and posture data.

In this case, when the current position of the 6th axis at the point P is, for example, +178° and the calculation result at the point P' is −178° (FIG. 5B), the operation command of the 6th axis is defined by the difference −178°−178°=−358°. Such operation command which is excessive as the interpolating operation per unit clock causes excessive operation on the 6th axis. If the 6th axis cannot follow the operation command even with the maximum operation speed of the 6th axis, an alarm function operates as the protection function, resulting in disabling operations. If the target value ANS exceeds ±180°, such conditions are produced.

According to the method shown in FIG. 4, in the case of the above example, after −178° is obtained as the target value ANS of the calculation result of the 6th axis at point P' in step 40, the absolute value of deviation between the current position of ±178° and the next target position −178° is obtained in step 41.

Namely, the absolute value of deviation of angle is expressed as follows.

*ABS (ANS−LAST)=ABS*
*(−178°−178°)=356°>180°*

Here, since ANS<0°, ANS'=−178°+360°=182° can be obtained in step 45. Therefore, the operation command of 6th axis becomes 182°−178°=+4°.

Thereby, the robot operates clockwise toward the target of corrected target value ANS'=+182° (same as −178° of ANS as the target position) from the current position LAST. This control system expands the easily operable range of robot to the angle under +360° exceeding +180°.

However, it has become apparent that a problem occurs in the operation in which some axis needs to be rotated for 360° or more and then is interpolated continuously.

Namely, in case there are two teaching points (S, E) as shown in FIG. 6A and the linear interpolating operation is carried out between these two points, it is supposed that the 6th axis rotates once or more at the interpolation starting point S and its current position is defined as +538°. In this case, as a result of reverse conversion at the target position P' after one unit clock, when the 6th axis is calculated to −178°, the following decision is made in step 41 by the correcting process of FIG. 4 for the link angle of target value ANS=178°.

*ABS (ANS−LAST)=ABS (−178°−538°)=716°*

In this case, the processing of steps 43 and 45 are applied and the following result can be obtained.

*ANS'=−178°+360°=+182°*

Here, when operation is carried out toward ANS from LAST, the operation of +182°−538°=−356° must be conducted.

However, the ideal target operation after the one unit clock is the operation for +4° and the operation data of −356° is actually given to the robot. The operation commands which define excessive interpolating operations per one unit clock result in excessive operations for the 6th axis, which cannot be followed even by the maximum operation speed of the 6th axis. In this case, the alarm function as the protection function operates, disabling operations.

Above explanation has been made for the 6th axis 7 shown in FIG. 3 and this is also applied to all robot axes having the operation range of ±360°.

In the case where the robot axes having the operation ranges of ±360° or more carry out multi-rotating (rotation more than ±360°), the correct interpolating operation cannot be realized with the conventional method which can be used only for the operation of under ±360°.

It is therefore and object of the present invention to solve such problems and realize interpolating operation by robot when the operating range is expanded to ±360° or more.

DISCLOSURE OF THE INVENTION

In order to achieve such objective, the robot control method having the multi-rotating axes of the present invention is characterized in that the interpolating operation is started, in the multiple axes joint type robot system of the teaching playback system, after the signal obtained by subtracting the rotation signal corresponding to the number of rotations indicated by an integer from the reference position of the axis from the rotating position signal after rotation of such axis is applied as the rotating position for start of interpolating operation so that the rotating position signal after rotation of axis becomes the signal corresponding to the angle range under ±360° for the reference position of axis in such a case that the interpolating operation is carried out following the multi-rotating of axes having the operating range of ±360° or more by the link operation.

In the multiple axes joint type robot system of the teaching playback system having the axes having the operating range of ±360° or more, the control apparatus of robot having multi-rotating axes of the present invention is characterized in comprising a means for detecting the rotating position of axis from the reference position, a rotation calculating means for calculating the rotation signal corresponding to the number of rotations indicated by an integer sent from the reference position of the axis from the detected rotating position signal, a rotating position correcting means for subtracting the calculated number of rotations from the rotating position signal before movement to the interpolating operation and an interpolation control calculating means for obtaining interpolation data based on the corrected rotating position signal calculated by the rotating position correcting means and the position data obtained based on the teaching data.

In the present invention, it is an object thereof to realize an interpolating control in the robot having the multi-rotating axes, namely the axis having the rotating range of ±360° or more. In the case of conducting the interpolating operation under the condition that the 5 axes rotate and the link angle becomes ±360° or more, a signal obtained by adding or subtracting the rotating angle corresponding to the integer times of the number of rotations to or from the current rotating position signal of the axes in accordance with the positive or negative sign of the rotating position signal is applied as a new position signal for starting the interpolating operation. In this case, the corrected link angle is under ±360° and thereby the successive interpolating operation can be controlled with the calculation method shown in FIG. 4.

For example, it is supposed here that the current value has become 360°×5 turns +60°=1860° through 5 turns and +60° of the axis having the operating range of ±360° or more. If the linear interpolating operation is attempted under this condition, since the operation command which is different from the link angle (within ±180°) of target value obtained by the reverse conversion becomes too large as the interpolating operation per one unit clock, an excessive operation is applied to operation of the 6th axis. If this 6th axis cannot follow such excessive operation even with its maximum operating speed, an alarm function as the protection function works, disabling the operation.

When calculation of "current value −360°× number of rotations" is carried out, the current value of +60° (1860°−360°×5 turns) can be obtained. Therefore, the interpolating operation can be controlled by updating the current value to "+60°".

BRIEF DESCRIPTION OF THE DRAWINGS

FIG. 4 is a flowchart indicating the rotating position calculating method in the conventional robot control method;

FIG. 5A, FIG. 5B, FIG. 6A and FIG. 6B are diagrams for explaining problems of the prior art.

DESCRIPTION OF THE PREFERRED EMBODIMENT

The present invention will be explained concretely with reference to the embodiment shown in the accompanying drawings.

Figure 1:
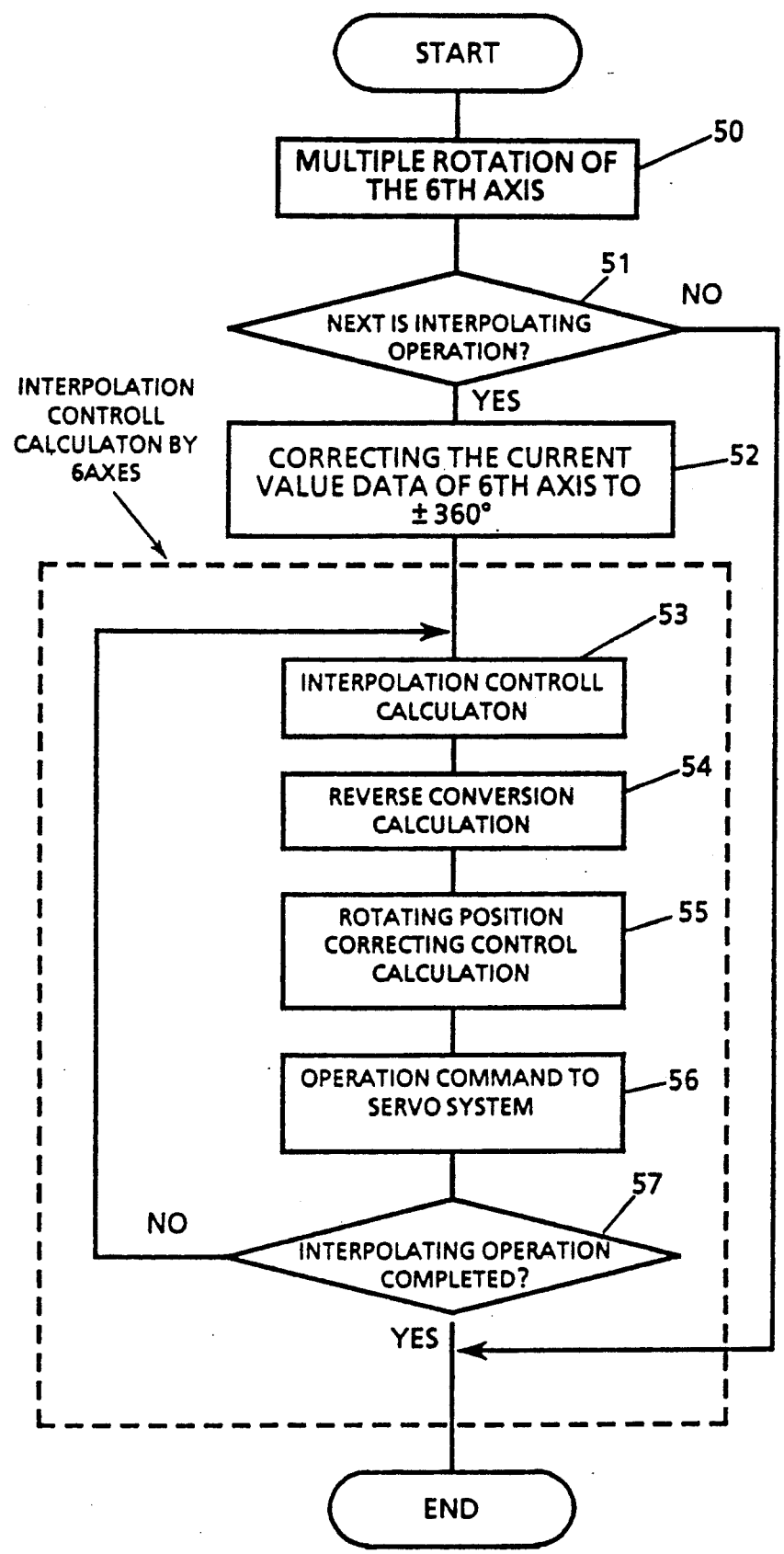
FIG. 1 is a flowchart indicating an embodiment of the robot control method of the present invention.

FIG. 1 is a flowchart indicating processing based on the present invention.

As shown in FIG. 1, the multi-rotation of the 6th axis provides the data of ±360° or more as the current values of this axis (step 50). Here, it is decided whether the current value of 6th axis is corrected or not depending on whether the next operation is the interpolating operation or not (step 51). When the next operation is the interpolating operation, the processing for correcting the current value data of 6th axis the under ±360° is executed (step 52).

When the current value of angle data of 6th axis is defined as Q', an integer value indicating the number of rotations as N and the corrected current value of angle data of 6th axis as Q, following relation can be obtained.

$$Q = Q' - 360 \times N$$

The corrected current value of angle data Q of the 6th axis is a value within ±360°.

Next, the interpolating control calculation (shown within the broken line of FIG. 1) by all six axes is carried out using the corrected current value of an angle data Q of 6 axes. Namely, the position data $P_x$, $P_y$, $P_z$ corresponding the next interpolation point and posture data $N_x$, $N_y$, $N_z$, $O_x$, $O_y$, $O_z$, $A_x$, $A_y$, $A_z$ are obtained for every one unit clock (step 53). Thereafter, the reverse conversion indicated by step 40 of FIG. 4, for example, is carried out using the corrected current value of angle data of 6th axis Q ($\theta_6$), position data $P_x$, $P_y$, $P_z$ and posture data $N_z$, $N_y$, $N_z$, $O_x$, $O_y$, $O_z$, $A_x$, $A_y$, $A_z$ (step 54).

In step 55, the rotating position correcting control calculation is carried out on the basis of the processing of steps 41-45 of FIG. 4. The operation command is output to the servo system (step 56) using the target value ANS' obtained here. Upon completion of the operations, the next interpolating point is given and the processing of steps 53-56 are repeated until the interpolating operation completes (step 57).

Figure 2:
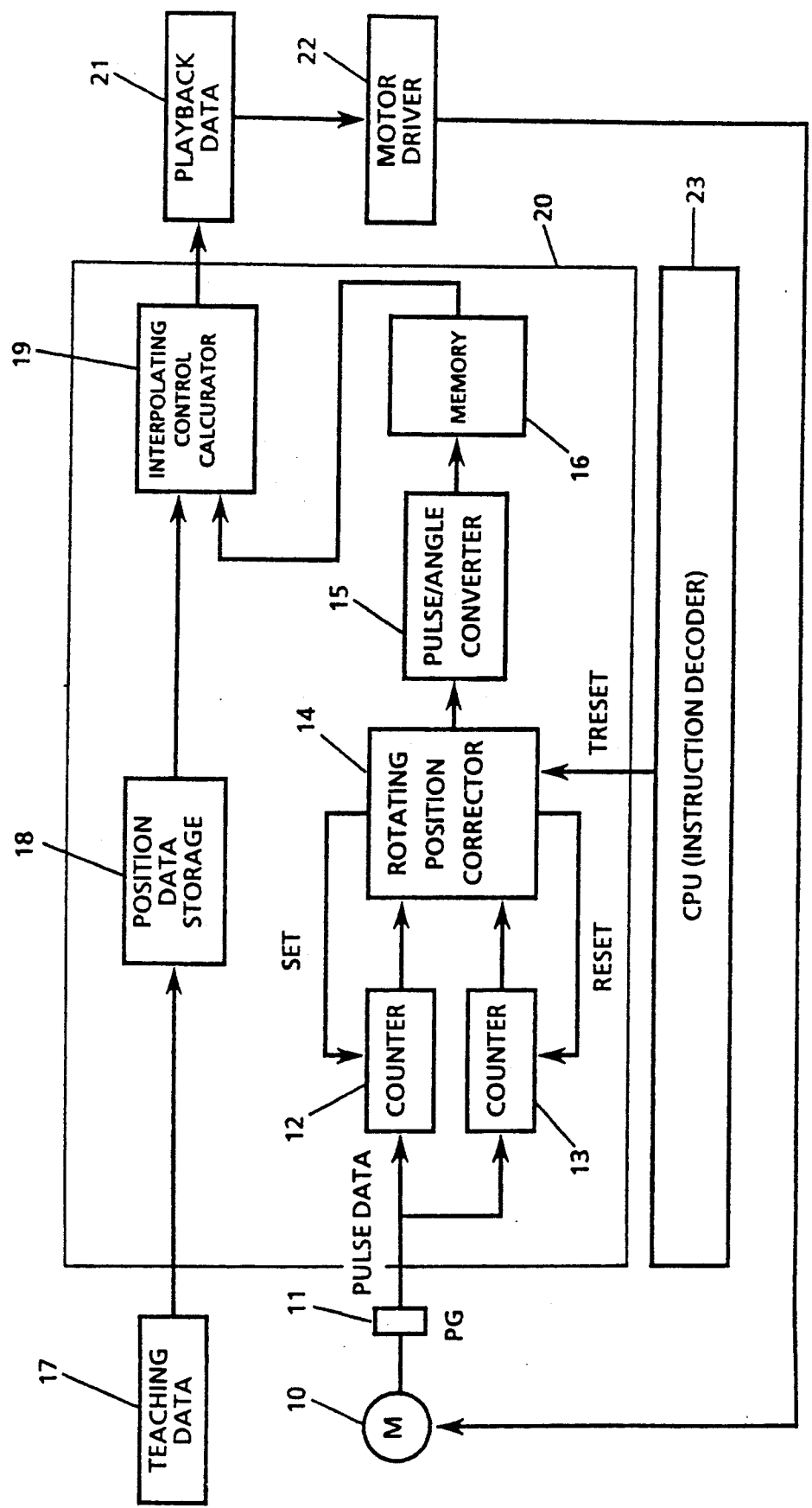
FIG. 2 is a block diagram of a structure of controller of the present invention.
Figure 3:
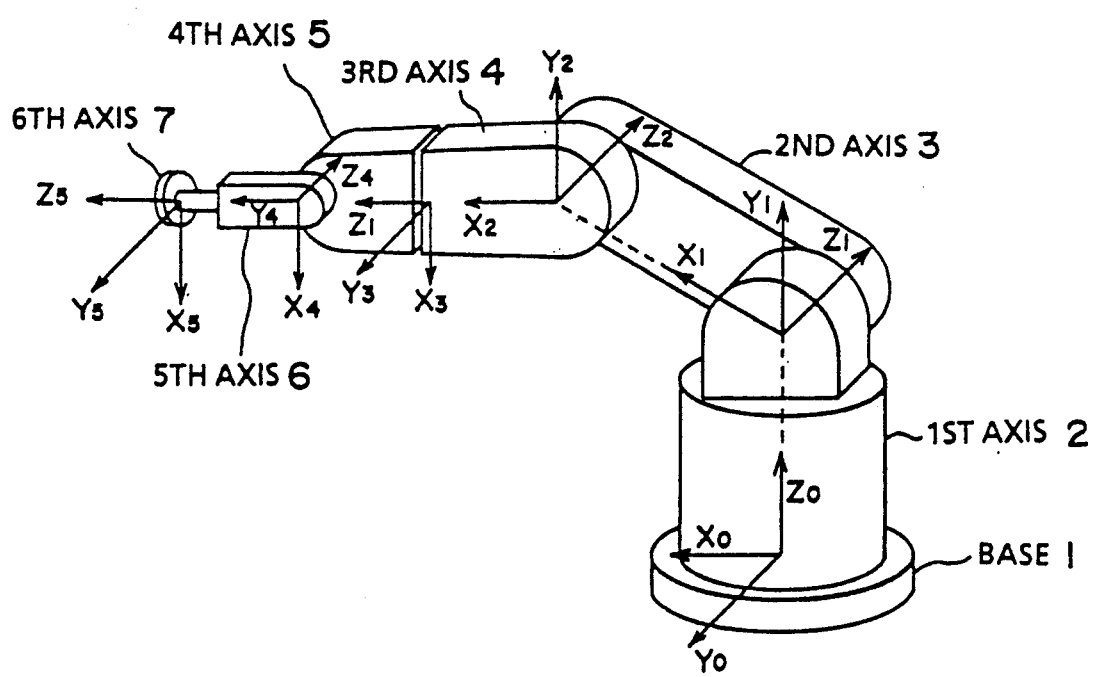
FIG. 3 is an outline view of 6 axes joint type robot.

In more detail, above calculation is conducted by the controller shown in FIG. 2. In FIG. 2, the pulse data from the PG (pulse generator) 11 for detecting the rotating position of axis drive motor 10 is received by CPU (central processing unit) 20 and is counted by a pair of counters 12, 13 in this timing.

The counter 12 counts up the pulse data from PG 11, while the counter 13 counts up rotation numbers of the axis.

When the position correcting instruction TRESET is executed from CPU (instruction decoder) 23 for decoding programs, the rotating position corrector 14 starts to execute the position correcting calculation of current value (data of counter 12) − resolution
value × the integer number of rotation (data of
counter 13)

and also conducts the processing for setting the corrected current value to the counter 12 and resetting (clearing) the rotation data of the counter 13. Here, resolution value means the number of output pulses of drive motor 10 (output of pulse generator PG 11) required for a single rotation of the axis.

The current value pulse data corrected in the position corrected 14 is converted to the angle data by the pulse-/angle converter 15 and is then stored in the memory 16.

Thereafter, the position data 18 generated from the teaching data 17 and corrected angle data are fetched at the time of executing the playback operation, the interpolating calculation is carried out by the interpolating control calculator 19, the angles $\theta_1$–$\theta_6$ of axes are calculated and these are output to the motor drive unit 22 as the playback data 21 to operate the robot.

An example of calculation in the rotating position corrector 14 will be considered here. For example, the resolution of the 6th axis is assumed as 100,000. In this case, it is also supposed that the 6th axis makes five turns and the current value of 6th axis becomes "540,000". If the linear interpolating operation is attempted by the conventional method, an alarm is generated from the robot controller by the reasons described above, disabling the operation of robot. When the calculation "current value − resolution value × number of rotations" is carried out in the rotating position corrector 14 shown in FIG. 2, the result "540,000−100,000×5=40,000" can be obtained. Therefore, the interpolating control operation by the method of FIG. 4 can be realized by updating the current value to "40,000".

The present invention will then be explained with a simple program for applying the present invention to the robot system for part painting.

In this example, following processes are carried out.

1) A robot hand catches a shaft of a work which has been hung by a hanger conveyor for entry.
2) While being hung, the work is rotated and soaked into the paint with its shaft positioned in vertical and is then rotated for several turns.
3) While being rotated, the work is taken out from the paint and is hung by the hanger conveyor while the shaft thereof is kept in vertical and then sent to the next drying process.

The following program describes a part of the painting process.

| Line | Step | Instruction | Note |
|------|------|-------------|------|
| 0000 | 000  | NOP         |      |
| 0001 | 001  | MOVJ VJ = 20.00 | (1) |
| 0002 | 002  | MOVL V = 375.0 | (2) |
| 0003 | 003  | MOVL V = 50.0 | (3) |
| 0004 | 004  | MOVJ VJ = 50.00 WT = 3 | (4) |
| 0005 | 005  | MOVJ VJ = 40.00 WT = 5 | (5) |
| 0006 | 006  | MOVJ VJ = 40.00 WT = 5 | (6) |
| 0007 | 007  | MOVJ VJ = 50.00 | (7) |
| 0008 |      | TRESET | (8) |
| 0009 | 008  | MOVL V = 500.0 | (9) |
| 0010 | 009  | MOVL V = 800.0 | (10) |
| 0011 |      | END |  |

Of the program language, the instruction word "MOVJ" indicates the link operation; "MOVL", the linear interpolating operation; "V", linear speed; "VJ", speed designation (percentage of maximum speed) during the link operation; "WT", designation of rotation; "TRESET", a command to replace the position signal of drive motor of 6th axis with the calculation of "current value − resolution value × number of rotations".

Operations in each step are as follows.

(1): Moving to the saving position of robot.
(2), (3): Clamping the shaft of the work hung by the hanger conveyor with a hand attached to the end part of wrist of robot.
(4): After clamping the shaft of work, rotating the 6th axis for three turns.
(5): Soaking a work into the paint while the 6th axis thereof is rotated for five turns.
(6): Lifting the work from the paint while the 6th axis thereof is rotated for five turns.
(7): Moving the robot to the saving position without rotation of the 6th axis.
(8): Resetting the current value pulse of the 6th axis.
(9), (10): Operating to the next step position by the linear interpolation.

With execution of the TRESET instruction in step (8) listed above, the current value of 6th axis is reset to the data within +1 turn. Therefore, the robot can realize the operations with the linear interpolating operation.

In this embodiment, the linear interpolation as a kind of interpolating operation is listed as an example. But, it is a matter of course that the other interpolating method, for example, a curve interpolation such as curvilinear interpolation, parabolic interpolation and spline curve interpolation can be used.

In above explanation, the method described in the Japanese Laid-open Patent No. 62-193786 has been introduced as a method of reverse inversion to convert the rectangular coordinate data into the data of each joint coordinate system at the time of executing the linear interpolating operation. However, the reverse conversion method is not limited only to this method and other reverse conversion method can also be employed.

As described previously, a signal obtained by adding or subtracting the signal corresponding to the integer times of the number of rotations of axis to/from the rotating position signal after rotation of the axis in accordance with the positive or negative sign of the rotating position signal is given as the rotating position at the time of starting posture control operation so that the signal indicating the rotating position after rotation of axis is set within the range of ±360° for the reference position of axis. Thereby, the interpolating operation can be made smoothly by the present invention for the area of ±360° or more for which the interpolating operation of robot has been difficult by the prior art and the operation range of the multiple joint type robot can be widened as much. Moreover, the robot can now be used in the field where it has never been introduced.

INDUSTRIAL FEASIBILITY

The present invention can be used for control of the robot which realizes painting by rotating works, the robot which realizes grinding by holding works or the robot which realizes coating by holding works.

We claim:

1. A control apparatus comprising a multi-rotating playback system having at least one multi-rotating axis with an operating range of ±360° or more, and a control system for controlling the axis to rotate to a determined position of said multi-rotating axis, said control system comprising:

a detector coupled to said axis to detect angular movement of said axis from a reference position of said axis, and means responsive to the output of said detector for producing a detected rotating position datum for the reference position of said multi-rotating axis;

a rotation calculator for providing a calculated rotation datum corresponding to an integral number of rotations for said reference position of said multi-rotating axis based on said detected rotating position datum;

a rotating position corrector for subtracting said calculated rotation datum from said rotating position datum and then executing an interpolating operation to provide a corrected rotating position datum;

a source of teaching data;

an interpolation control calculator for obtaining interpolating data based on the corrected rotating position datum provided by said rotating position corrector and the position datum obtained on the basis of said teaching data, and a drive arrangement connected to said axis to rotate said axis an amount corresponding to said interpolating data.

2. A control apparatus for a robot according to claim 1, wherein said rotating position corrector comprises means for adding the rotation datum calculated on said rotating position datum to said rotating position datum when the rotating position datum after said multiple rotation of said multi-rotating axis has a negative sign, and further comprising a memory connected to said interpolating control calculator to store interpolating data based on the corrected rotating position datum provided by said rotating position corrector, for application to said interpolation control calculator, and a position data storage connected to store the output of said source of teaching data for application to said interpolation calculator.

* * * * *